(12) United States Patent
Wayne

(10) Patent No.: US 6,478,356 B1
(45) Date of Patent: Nov. 12, 2002

(54) CARGO AREA STRUCTURE

(76) Inventor: Mark Wayne, 29436 Briarbank Ct., Southfield, MI (US) 48034

(*) Notice: Subject to any disclaimer, the term of this patent is extended or adjusted under 35 U.S.C. 154(b) by 0 days.

(21) Appl. No.: 09/477,873

(22) Filed: Jan. 5, 2000

(51) Int. Cl.$^7$ .............................................. B60R 13/01
(52) U.S. Cl. .................................................. 296/39.2
(58) Field of Search ............................ 296/39.1, 39.2, 296/183; 410/69, 94, 101, 102, 106, 121, 129, 140

(56) References Cited

U.S. PATENT DOCUMENTS

| | | | | |
|---|---|---|---|---|
| 241,545 A | * | 5/1881 | Kelly | 296/24.1 |
| 560,893 A | * | 5/1896 | Conant | 220/551 X |
| 1,059,058 A | * | 4/1913 | McDonald | 296/39 R |
| 1,858,408 A | * | 5/1932 | McEniry | 410/140 |
| 2,214,042 A | * | 9/1940 | Burdick | 220/543 X |
| 2,697,631 A | * | 12/1954 | Miller | 296/37.6 X |
| 2,784,027 A | * | 3/1957 | Temp | 296/37.6 X |
| 2,817,305 A | * | 12/1957 | Stough | 410/144 |
| 2,845,307 A | * | 7/1958 | Holmes | 410/144 X |
| 2,912,939 A | * | 11/1959 | Miner, Jr. | 410/145 |
| 2,985,333 A | * | 5/1961 | Kirkman | 220/22.3 |
| 3,114,338 A | * | 12/1963 | Schroeder et al. | 410/146 |
| 3,352,595 A | * | 11/1967 | Bezlaj | 410/132 X |
| 3,431,015 A | * | 3/1969 | Breen et al. | 410/89 X |
| 3,578,378 A | * | 5/1971 | Anderson | 296/100 |
| 3,640,565 A | * | 2/1972 | Anderson | 296/100 |
| 4,079,677 A | * | 3/1978 | Vandergriff et al. | 410/147 |
| 4,085,685 A | * | 4/1978 | Stone | 410/146 |
| 4,091,745 A | * | 5/1978 | Patch | 410/146 |
| 4,215,878 A | * | 8/1980 | Ulics | 296/183 |
| 4,215,898 A | * | 8/1980 | Ulics | 296/183 |
| 4,226,348 A | * | 10/1980 | Dottor et al. | 224/42.42 |
| 4,236,854 A | * | 12/1980 | Rogers | 410/121 |
| D259,928 S | * | 7/1981 | Weis et al. | D12/98 |
| 4,283,083 A | * | 8/1981 | Johnson | 296/37.1 X |
| 4,305,695 A | * | 12/1981 | Zachrich | 296/37.1 X |
| 4,343,578 A | * | 8/1982 | Barnes | 410/151 |
| D271,009 S | * | 10/1983 | Fishler | 296/39.2 X |
| 4,436,215 A | * | 3/1984 | Kleinert et al. | 220/22.3 |

(List continued on next page.)

FOREIGN PATENT DOCUMENTS

| | | | | |
|---|---|---|---|---|
| CA | 580720 | * | 8/1959 | 410/145 |
| DE | 1 480 329 | | 3/1970 | 296/37.1 |
| DE | 2140164 | * | 2/1973 | 224/42.42 R |
| DE | 29 33 130 A1 | | 3/1981 | 296/37.1 |
| DE | 31 06 116 A1 | | 9/1982 | 296/37.16 |
| DE | 3106116 | * | 12/1982 | 296/37.16 |
| FR | 1439762 | * | 4/1966 | 296/39 R |
| FR | 1565411 | * | 3/1969 | 220/22.3 |
| FR | 1545411 | | 10/1969 | |
| GB | 2240755 | * | 8/1991 | 296/39.1 |

OTHER PUBLICATIONS

"Flipliner" Brochure, Buddy Plastics Division, Anderson Tank Manufacturing Co., Copy in undated.*
Commercial Car Journal, Jun. 1979, "Reversible Liner", p. 220, copy in Jun. 1979.*
1 page information sheet, "Installation of MARTECTOR in New Duraliner with Slots" Rev#1, (Apr. 14, 1996).

*Primary Examiner*—Dennis H. Pedder
(74) *Attorney, Agent, or Firm*—Gifford, Krass, Groh, Sprinkle, Anderson & Citkowski, P.C.

(57) ABSTRACT

A truck bed or bedliner for a cargo carrier includes a transverse divider received in sidewall slots and a loop engaging a side of the divider to secure the divider in position.

16 Claims, 10 Drawing Sheets

U.S. PATENT DOCUMENTS

| | | | | |
|---|---|---|---|---|
| 4,473,331 A | * | 9/1984 | Wisecarver | 410/151 X |
| 4,491,362 A | * | 1/1985 | Kennedy | 296/901 X |
| 4,505,508 A | * | 3/1985 | Carter | 296/39 R |
| 4,507,033 A | * | 3/1985 | Boyd | 296/37.6 X |
| 4,531,775 A | * | 7/1985 | Beals | 220/532 X |
| 4,540,214 A | * | 9/1985 | Wagner | 296/39 R |
| 4,572,568 A | * | 2/1986 | Knapp et al. | 296/39 R |
| 4,573,731 A | * | 3/1986 | Knaack et al. | 296/37.6 |
| 4,575,146 A | * | 3/1986 | Markos | 296/39 R |
| 4,580,827 A | * | 4/1986 | Feagan | 296/37.6 |
| 4,592,583 A | * | 6/1986 | Dresen et al. | 296/39 R |
| 4,623,187 A | * | 11/1986 | Ibrahim | 296/39 R |
| 4,702,653 A | * | 10/1987 | Gaulding | 410/144 |
| 4,717,298 A | * | 1/1988 | Bott | 410/94 X |
| 4,720,222 A | * | 1/1988 | Nagy et al. | 410/151 |
| 4,737,056 A | * | 4/1988 | Hunt | 410/151 |
| 4,750,776 A | * | 6/1988 | Barben | 296/39.2 |
| 4,767,147 A | * | 8/1988 | Rye | 224/42.42 X |
| 4,772,165 A | * | 9/1988 | Bartkus | 410/145 X |
| 4,781,499 A | * | 11/1988 | Wisecarver | 410/151 |
| 4,834,599 A | * | 5/1989 | Gordon et al. | 410/151 |
| 4,880,342 A | * | 11/1989 | Pradovic | 410/121 |
| 4,887,147 A | * | 12/1989 | Bott | 296/39.2 X |
| 4,887,947 A | * | 12/1989 | Bott | 296/39.2 X |
| 4,889,253 A | * | 12/1989 | Schmulian et al. | 220/551 |
| 4,917,429 A | * | 4/1990 | Giger | 220/552 X |
| 4,943,194 A | * | 7/1990 | Aguilar | 410/141 X |
| 4,961,677 A | * | 10/1990 | Downard, Jr. | 410/129 |
| 4,964,768 A | * | 10/1990 | Shomo | 410/121 X |
| 4,976,490 A | * | 12/1990 | Gentle | 296/183 |
| 4,986,706 A | * | 1/1991 | Williams, Jr. | 410/140 X |
| 5,044,682 A | | 9/1991 | Wayne | 296/39.2 |
| 5,090,763 A | * | 2/1992 | Kremer et al. | 410/121 X |
| 5,154,478 A | * | 10/1992 | Erickson et al. | 296/39.2 |
| 5,167,433 A | * | 12/1992 | Ryan | 296/39.1 X |
| 5,259,712 A | | 11/1993 | Wayne | 410/152 |
| 5,265,993 A | | 11/1993 | Wayne | 410/129 |
| 5,597,193 A | * | 1/1997 | Conner | 296/39.2 X |
| 5,655,863 A | * | 8/1997 | Mundt | 296/39.2 X |
| 6,203,086 B1 | * | 3/2001 | Dirks et al. | 296/37.6 |

* cited by examiner

CARGO AREA STRUCTURE

BACKGROUND OF THE INVENTION

The present invention relates to structures for cargo areas for pick-up trucks, and more particularly to means in the form of dividers for partitioning the cargo space and means to anchor the dividers to a liner or a truck pick up box and means for covering a selected divided area.

DESCRIPTION OF THE PRIOR ART

Structures, such as liners, have been previously provided to protect the beds of pick-up trucks from the abrasive effects of using the truck to haul cargo. These liners have met with considerable commercial success in recent years. Such liners not only protect the bed of the truck, but enhance the appearance of the vehicle. When the vehicle is to be resold the liner can be removed to provide a bed which has the finish originally provided, or it can be replaced with another liner.

However, prior to my prior patent applications, no such structure has been provided with means to partition the cargo space into areas of selected sizes to accommodate different cargo, and to provide a means of maintaining the cargo in place as it is being transported by the vehicle. Further, the provision of means to cover selected divided cargo areas appears to be new.

Recently truck manufacturers have elected to construct the truck bed of plastic or similar material negating the need for a protective bed liner. A need remains to partition such truck beds into compartments.

SUMMARY OF THE PRESENT INVENTION

In one form of the present invention, a liner is provided which is intended to be used to protect a bed of a pick-up truck, and which includes partitioning means which permits the liner to be partitioned to accommodate cargos of various sizes. The partitioning means takes the form of dividers and slots or the like, formed in the liner to receive the dividers. The dividers can also be provided with slots to receive dividers to thereby provide a variety of configurations to accommodate cargos of sizes over a wide range. With the dividers locked in place, cargo can be placed in the cargo areas defined by the dividers and will be retained in place as the cargo is transported by the truck.

Means are provided to securely lock the divider to the bed of the pick-up truck or to the truck bed liner.

The present invention can also be in the form of the truck bed itself of a pick-up truck being provided with slots or similar means to accommodate dividers to divide the box into distinct cargo areas.

When the truck bed is provided with the slots to receive the dividers means are provided to lock the dividers to the truck bed.

A cover is provided which is adapted to fit over and cover selected cargo areas formed by the dividers.

BRIEF DESCRIPTION OF THE DRAWING

A better understanding of the present invention will be had upon reference to the following drawing in which like reference numerals refer to like parts throughout the several views, and in which.

DESCRIPTION OF THE PREFERRED EMBODIMENTS

Figure 1:
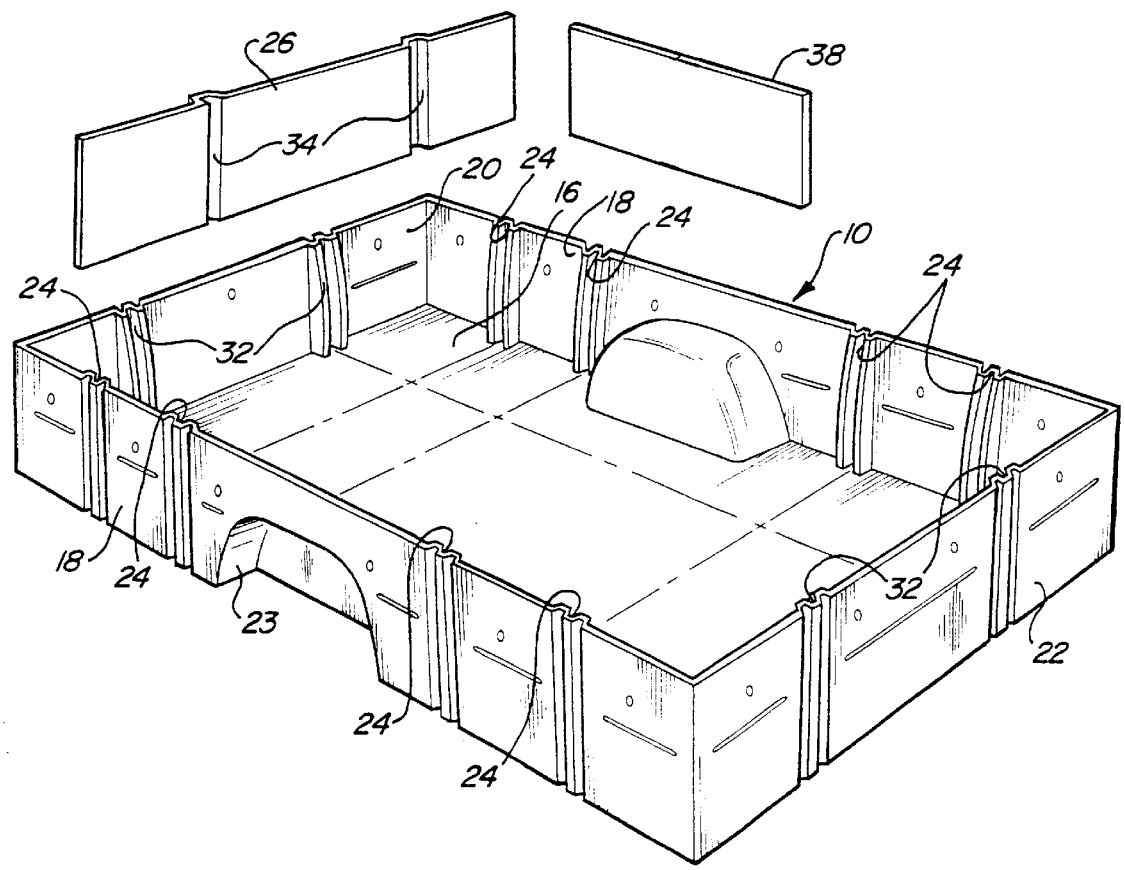
FIG. 1 is a partially exploded perspective view of the preferred embodiment of the present invention.

Referring to FIG. 1, the preferred liner 10 of the present invention is illustrated as being intended for use in a pick-up truck bed. The liner 10 includes a floor 16, sidewalls 18, a forward end wall 20, and a rearward end wall 22. The liner 10 is preferably constructed of a heavy plastic or similar resilient, yet strong material. As is common, the liner 10 is molded or otherwise formed into a box-like configuration. Openings 23 are provided in the exterior portion of the sidewalls 18 to accommodate the wheel wells of the pick-up truck (not shown).

The sidewalls 18 of the liner 10 are provided with a plurality of inwardly facing, vertically extending slots 24 spaced along the interior length of the wall. The slots 24 on one of the sidewalls 18 are each aligned with a corresponding slot 24 on the opposite side wall 18 to removably receive a transversely extending divider 26. A plurality of the dividers 26 are provided so that a number of pairs of slots 24 can be used to divide the liner 10 into a plurality of transversely extending cargo carrying areas (see, for example, FIG. 3). The end walls 20 and 22 are also provided with inwardly facing vertically extending slots 32, similar in construction to the slots 24, and which align with corresponding slots 32 on the opposite end wall. Dividers 38 can be provided to be received in the slots 32 to divide the liner 10 into elongated cargo carrying areas. The dividers 26 are also preferably provided with vertically extending slots 34 which receive the dividers 38 to further divide the cargo area into smaller areas to accommodate smaller cargo.

Figure 2:
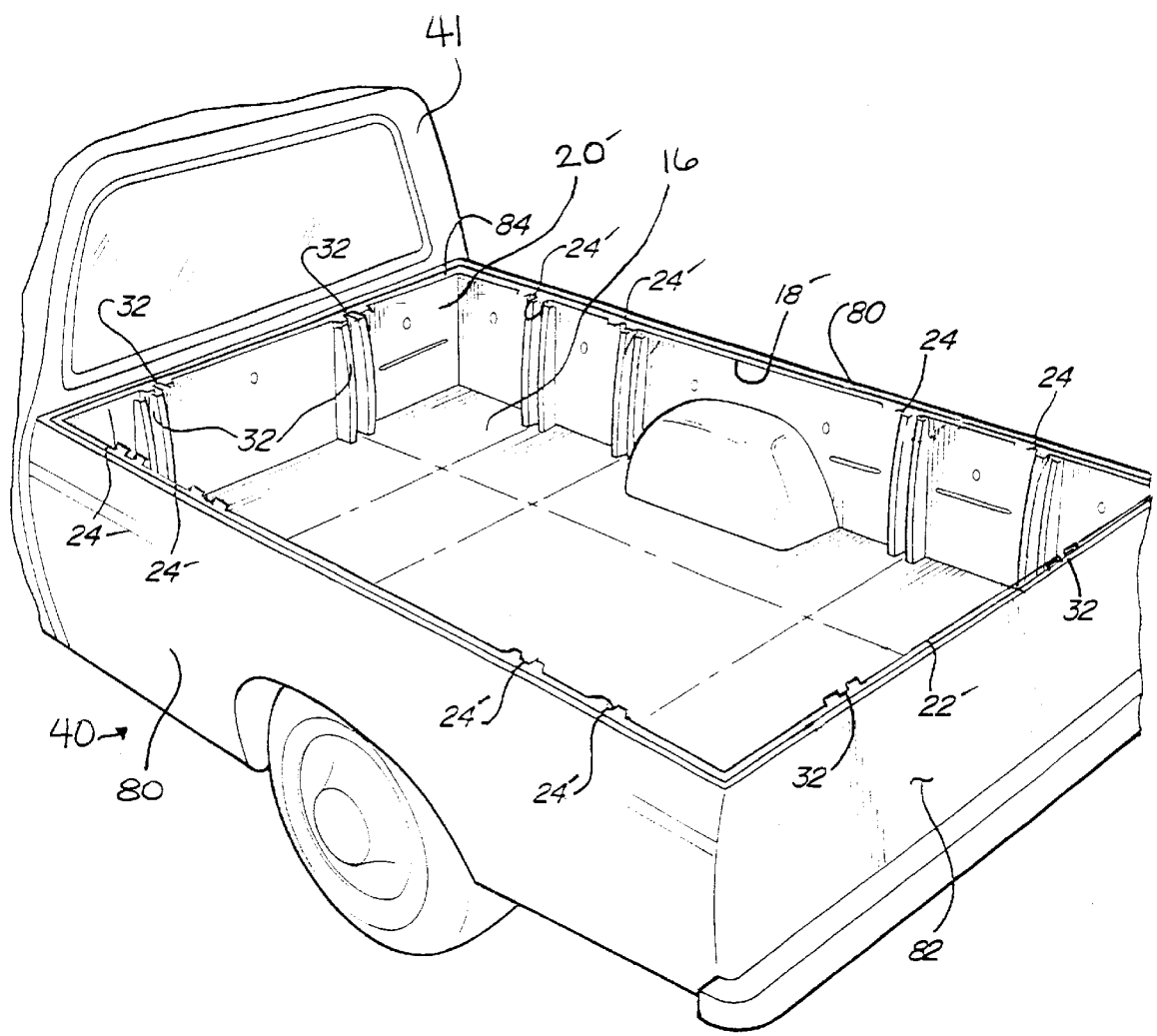
FIG. 2 is a partial perspective view illustrating another preferred embodiment of the present invention.

With reference to FIG. 2, a further embodiment of the present invention is illustrated and includes a truck bed in the form of a one-piece, unitized box, generally indicated as 40, fitted behind a conventional truck cab 41.

The box 40 is preferably composed of a polymerizable material such as resilient and durable plastic. The box 40 may be formed as a single piece or may be two or more pieces welded together by heat or chemical treatment so as to form a one-piece box 40.

The box 40 includes a pair of outer walls 80, a front wall 84, and a rear wall 82. The rear wall 82 may be hinged to function as a door or tailgate.

The box 40, in other respects, includes the elements of the liner 10 of FIG. 1, such as a floor 16, side walls 18, a forward end wall 20, and a rearward end wall 22. The box 40 further includes vertically extending slots 24 and 32.

The advantages offered by the box 40 over a conventional pick-up box are manifold and include being resilient to dents, rust-resistant and lightweight. The box 40 may be fitted behind the cab 41 when the cab 41 is newly produced or may replace a damaged or undersized conventional pick-up box.

Figure 3:
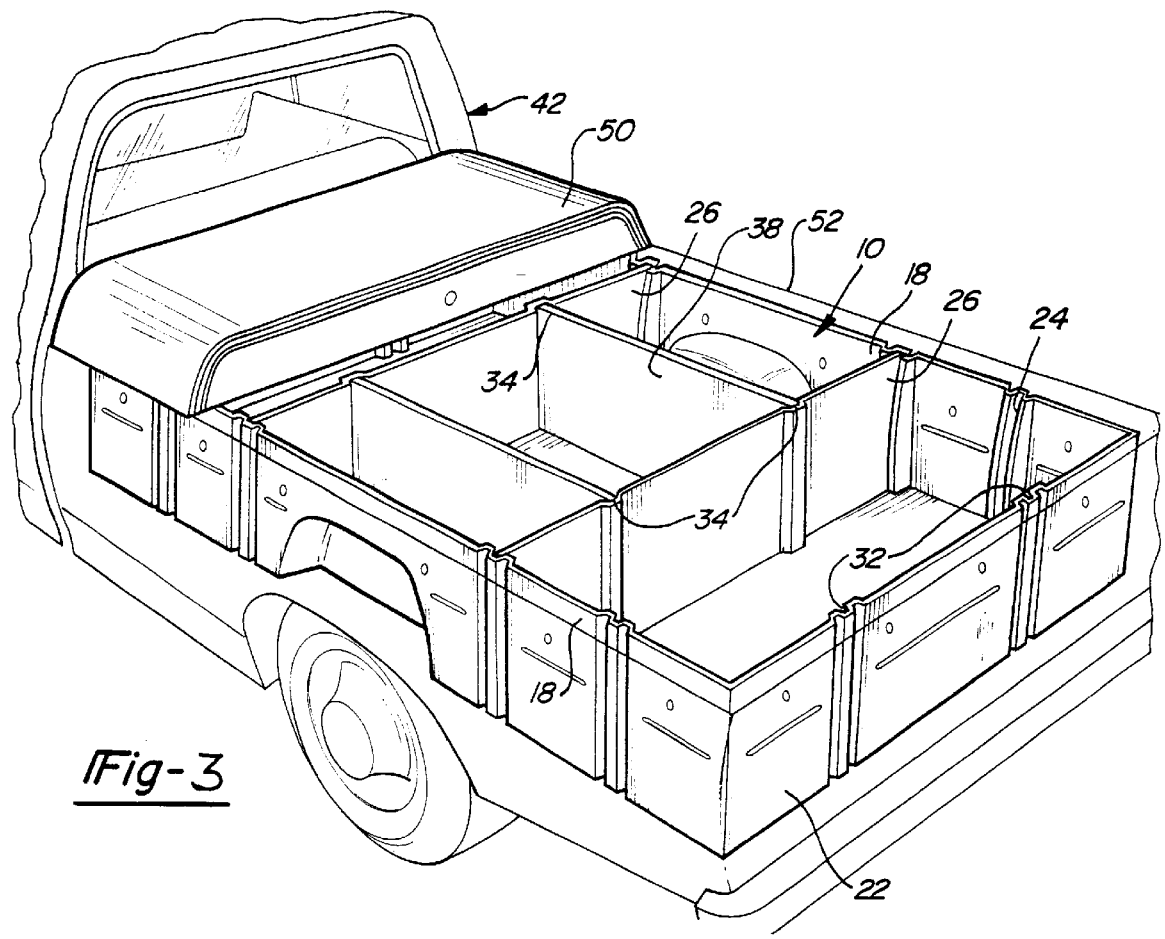
FIG. 3 is a fragmentary perspective view of another preferred embodiment of the present invention illustrating the liner in place in the bed of a pick-up truck.

Illustrating again the liner 10 of the embodiment discussed initially, as shown in FIG. 3, the liner 10 of the present invention sits in the bed of the pick-up truck 42, and utilizes dividers 26, 38 and slots 24, 32 and 34 to divide the bed of the truck 42 into cargo holding areas of different sizes to accommodate cargo of different sizes.

While the liners 10 and 40 have been described as including sidewalls 18 and end walls 20 and 22, it should be realized that it may be desirable in some situations to provide the liner without either an end wall or a sidewall, or with portions of these walls removed. For instance, it may be desirable to provide the liners 10 or the box 40 without the end wall 22 to permit access to the interior of truck bed through the tailgate 54 commonly provided on such trucks.

Figure 4:
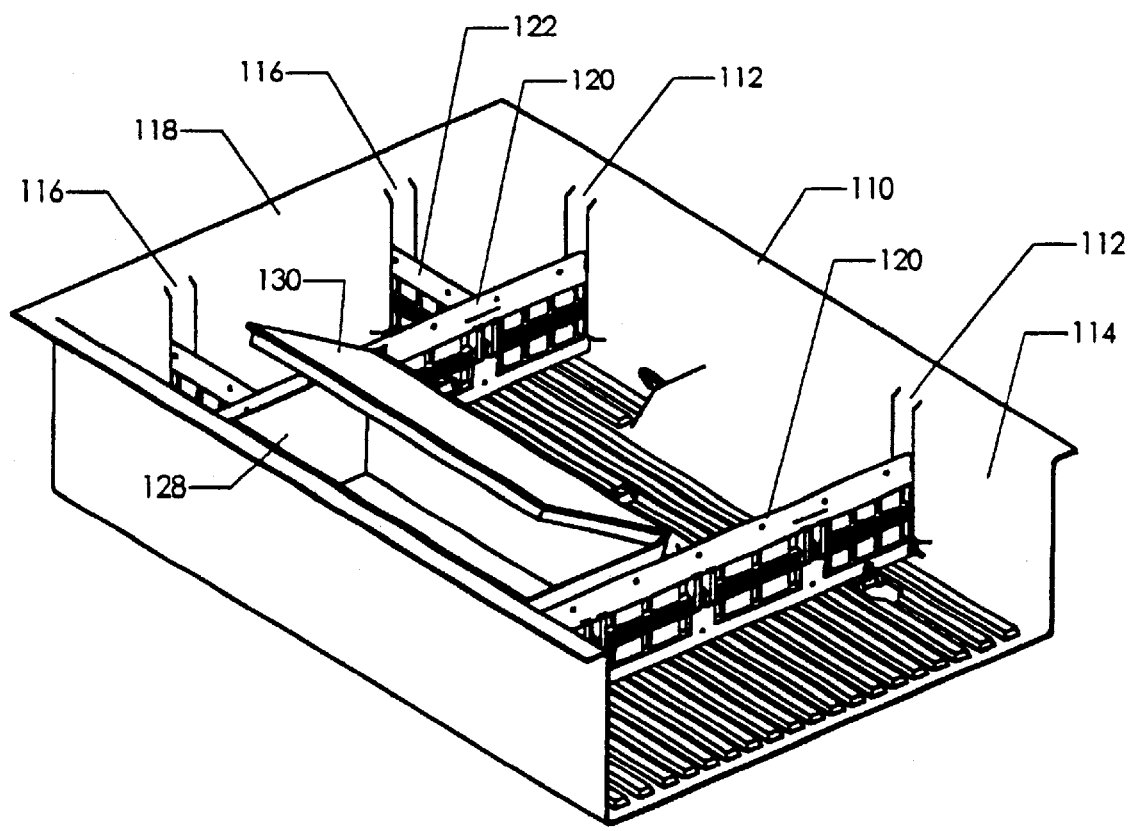
FIG. 4 is a fragmentary perspective view similar to a portion of the structure shown in FIG. 3.

Now referring to FIG. 4 for a description of another preferred embodiment of the present invention a liner 110 is shown therein as including slots 112 formed in sidewalls 114 of the liner 110 and slots 116 formed in a front wall 118 of the liner 110.

Dividers 120 extend between the slots 112 to divide the interior of the liner 110 into compartments. Dividers 122 are provided to extend between the slots 116 and one of the dividers 120 to further divide the interior of the liner 110 into compartments.

Figure 5:
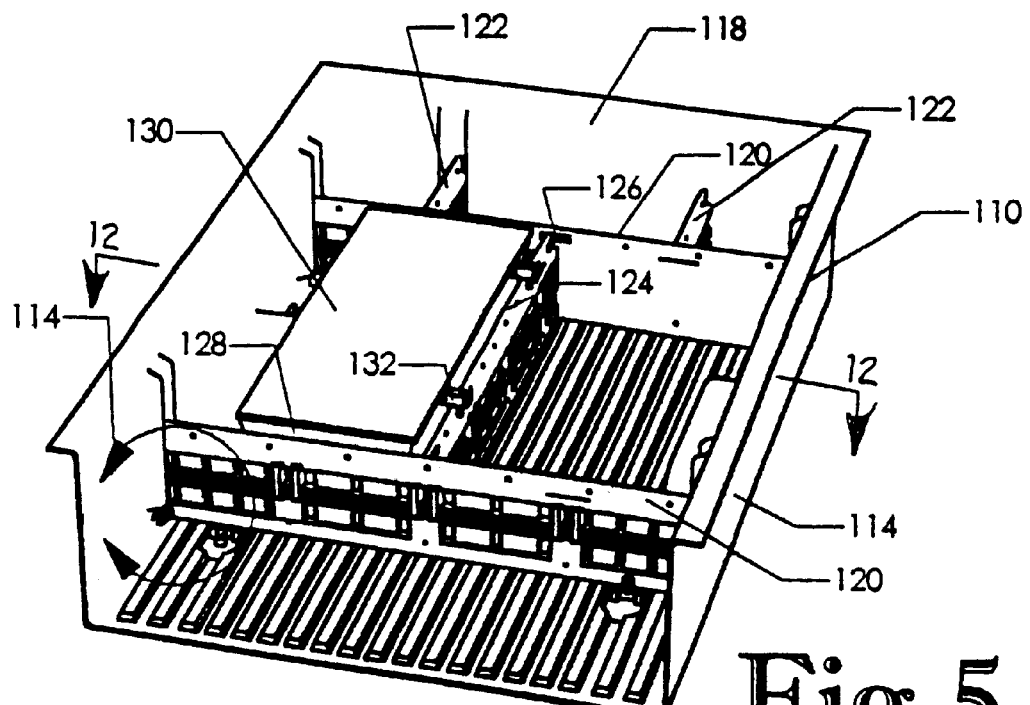
FIG. 5 is a perspective view of another preferred embodiment of the present invention.
Figure 12:
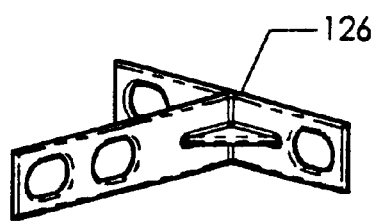
FIG. 12 is an enlarged perspective view of a portion of the hinge used with the box shown in FIG. 11.

As can best be seen in FIG. 5 a longitudinal divider 124 extends between the transverse dividers 120 and is mounted thereto by brackets 126 (FIG. 12).

Figure 9:
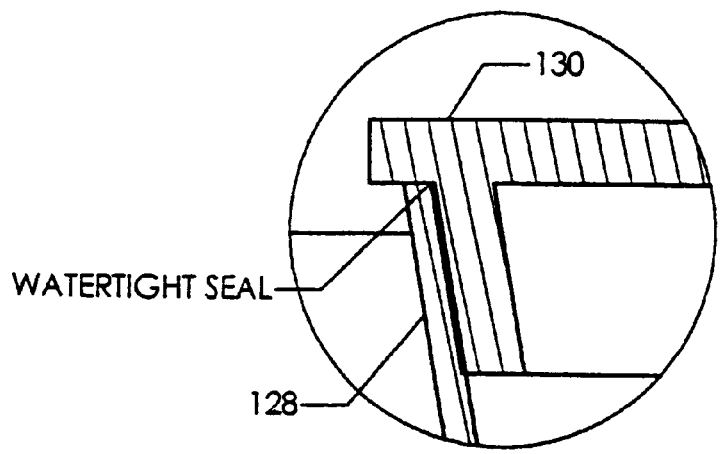
FIG. 9 is an enlarged fragmentary view of a portion of the structure shown in FIG. 8.
Figure 13:
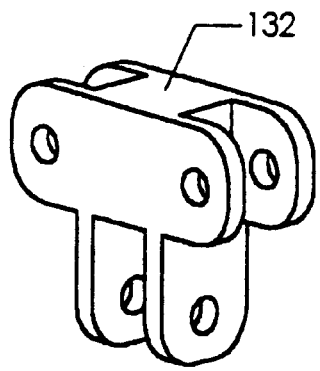
FIG. 13 is an enlarged perspective view of another portion of the hinge used with the box shown in FIG. 11.
Figure 11:
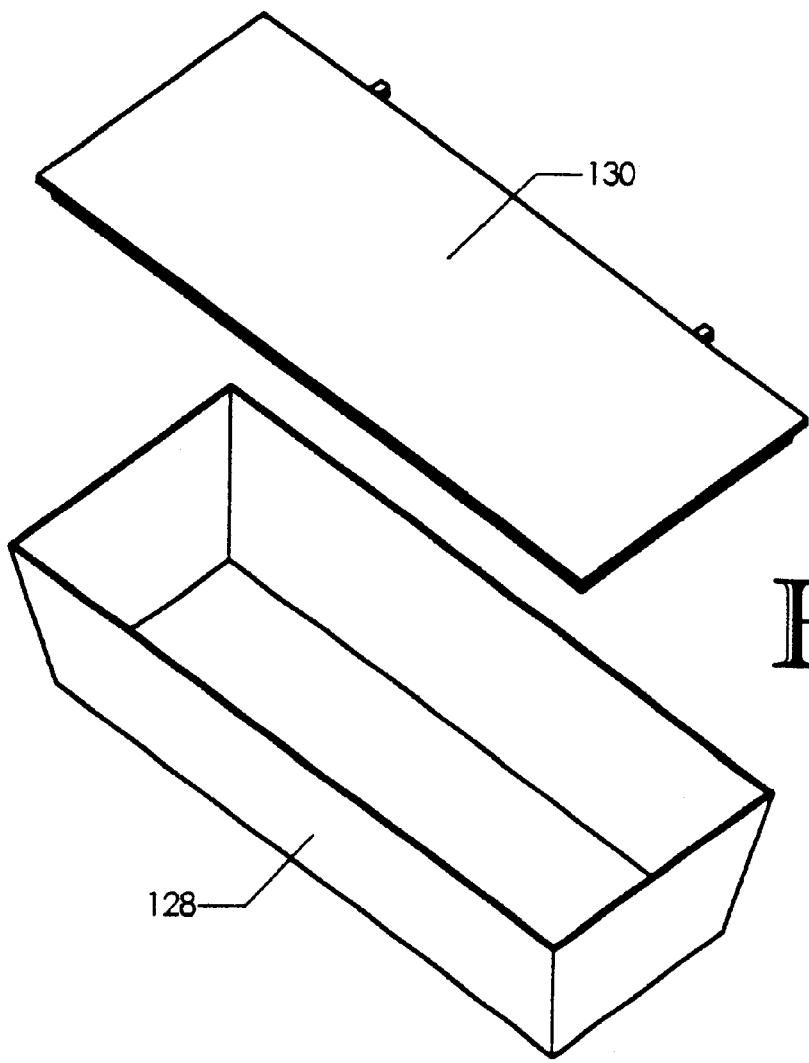
FIG. 11 is a perspective view of a portion of the structure shown in FIG. 5.

As best seen in FIGS. 9 and 11 a box 128 is provided having a cover 130. The box 128 is positioned between the divider 124 and the sidewall 114 with the cover 130 fastened to the divider 124 by hinge members 132. The hinge member 132 are best seen in FIGS. 13.

Figure 8:
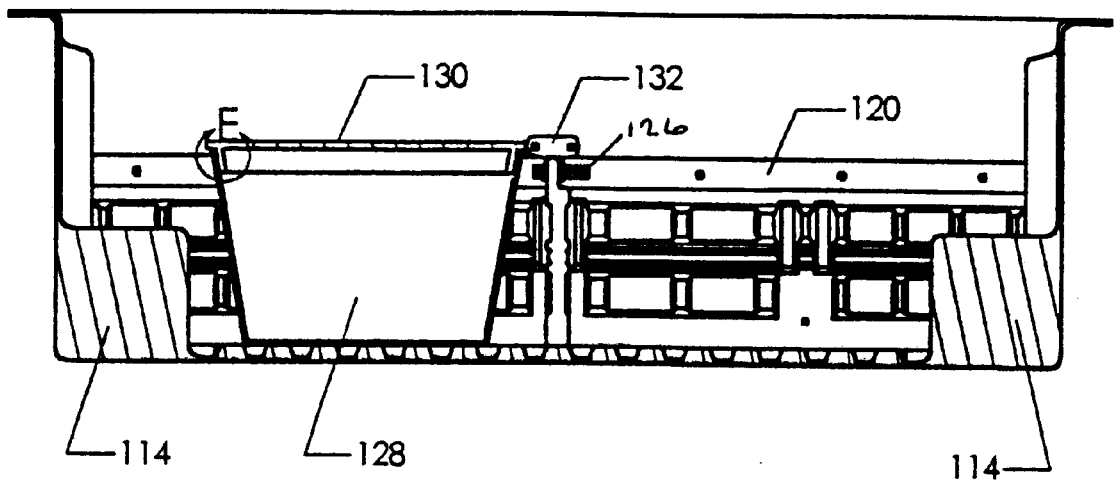
FIG. 8 is a transverse cross-sectional view of another preferred embodiment of the present invention.

As best seen in FIGS. 8 and 9 the cover 130 and a sidewall 136 of the box 128 form a weather-tight seal in a conventional manner along the joint 138.

Figure 6:
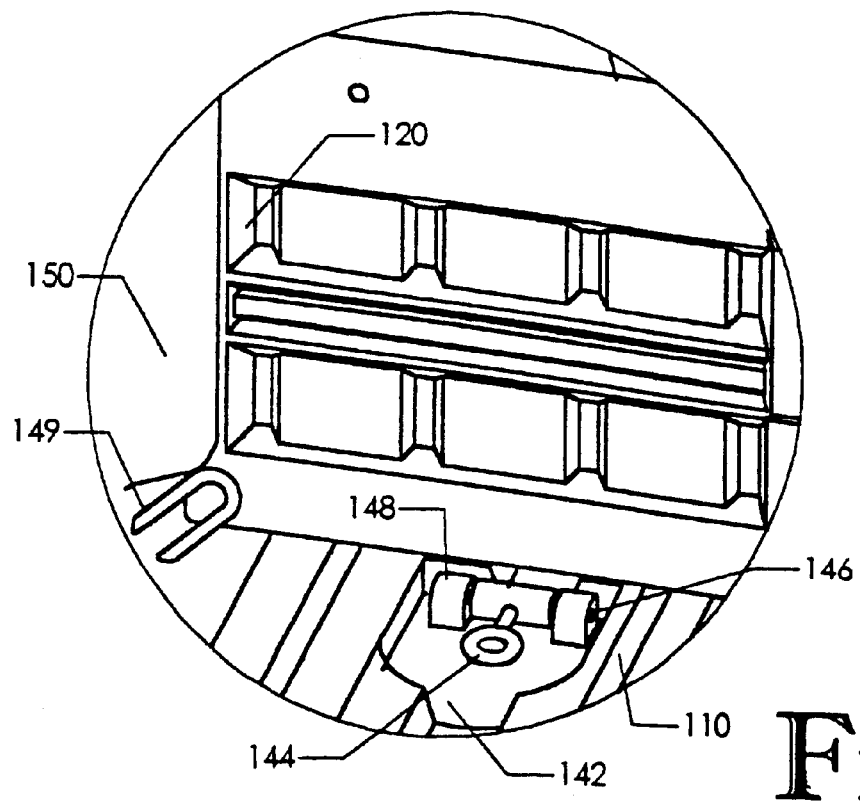
FIG. 6 is an enlarged view of the circled portion of FIG. 5.
Figure 7:
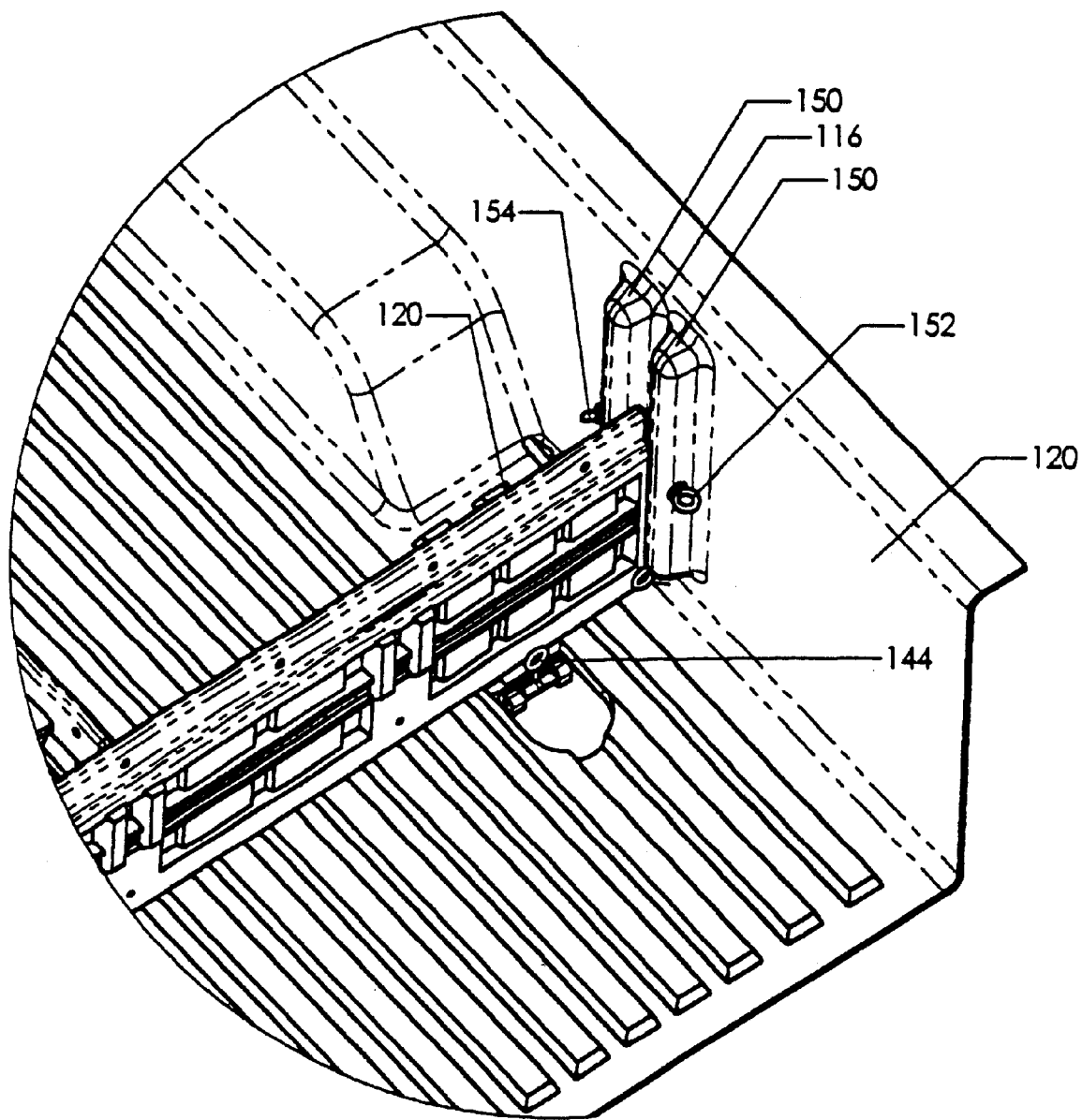
FIG. 7 is a fragmentary perspective view of another preferred embodiment of the present invention.

As best seen in FIGS. 5 and 6 the dividers 120 are mounted in place by stop members 140 which are mounted to the bed 142 of the truck and have a pivotal portion 144 which can be rotated upwardly to the position shown in FIG. 7 to engage one of the sides of the divider 120 and to urge the other side of the divider 120 against the face forming the slot 116 to retain the dividers 120 in place and to prevent them from disengaging from the slots 116 as the truck is in use.

The pivotal portion 144 is shown (FIG. 6) to be in the form of an eyebolt having a transverse portion 146 which is pivotally retained by pivot blocks 148. It is apparent that other means could be provided to prevent the dividers 120 from moving back and forth in the slots 116. The portion 144 extends upwardly through an opening provided in the truck bed liner 110.

A U-shaped member 149 (FIG. 6) or other similar stop member can be fastened by welding or the like to the sidewall 150 of the truck bed to engage the dividers 120 to aid in preventing movement of the dividers 120 in the slots 116.

Figure 10:
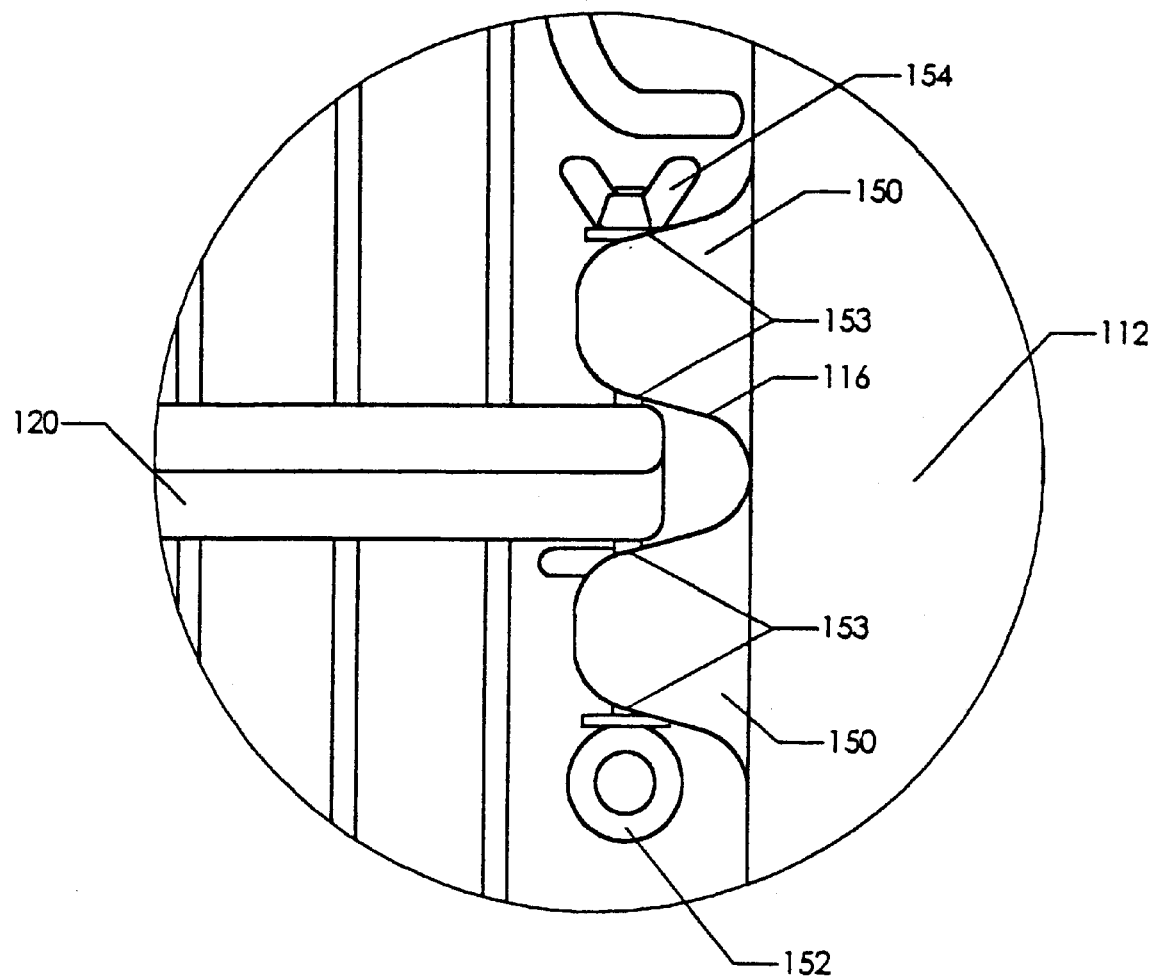
FIG. 10 is an enlarged fragmentary elevational view of the structure shown in FIG. 7.

FIGS. 7 and 10 disclose an embodiment wherein the slot 116 is formed by spaced protrusions 150. In such a construction an eyebolt 152 is provided which extends through holes 153 formed through the protrusions 150 and through the end of the divider 120 to lock the divider 120 in the slot 116. A wing nut 154 or the like will retain the eyebolt 152 in the mounted position. Such an eyebolt 152 is provided at each end of each divider 120 to extend through the holes 153 formed in each protrusion 150.

Figure 14:
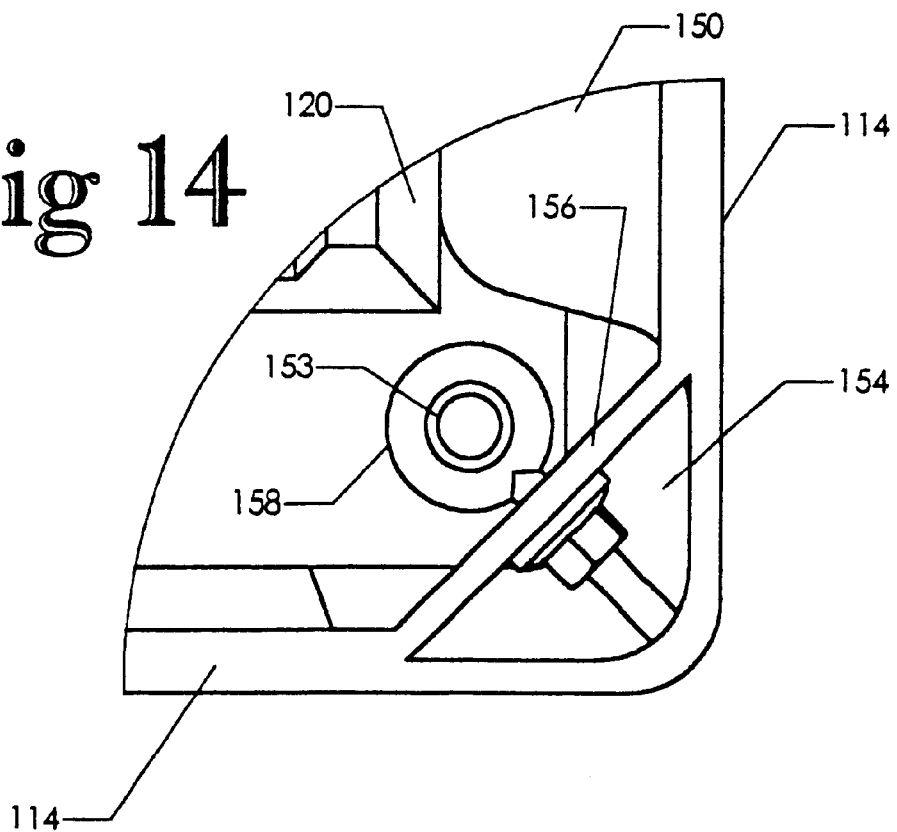
FIG. 14 is an end view of preferred means for locking a divider in place.
Figure 15:
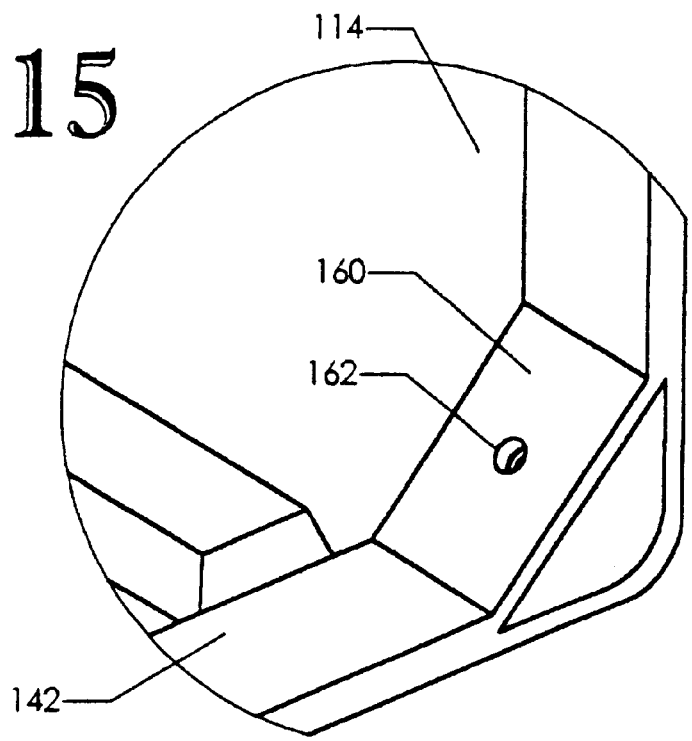
FIG. 15 is an elevational view of another preferred means for locking a divider in place.

FIGS. 14 and 15 disclose other preferred means for fixing the dividers 120 in place by preventing them from moving transversely in the slots 116.

In FIG. 14 the bed liner 112 is formed with a corner pocket 154 by a corner support 156 which provides the means to position an eyebolt 158 or the like to engage the face of the divider 120 to aid in retaining the divider 120 in place in the slot (not shown).

FIG. 15 discloses a metal plate 160 adapted to be welded or otherwise mounted directly to the truck bed 142. The plate 160 is provided with a threaded opening 162 to receive an eyebolt (not shown) or the like. The plate 160 is positioned so that an eyebolt mounted in the hole 162 will engage the face of a divider 120 to maintain the divider 120 in the slot 116.

It should be understood that while the various embodiments of the present invention have been described as being used with a truck bed liner with suitable modifications the invention can be used with just the truck bed without the liner. Truck beds are being formed today of plastic and other similar materials and with slots so that the need for a liner has been substantially reduced. But where metal truck beds are provided with pre-formed slots, the divider arrangement of the present invention can be used with the various fastening means which have been described being mounted directly to the bed of the truck.

Also although several embodiments of the present invention have been disclosed, it should be apparent to one with ordinary skill in the art that many other modifications can be made without departing from the spirit of the present invention as expressed by the scope of the appended claims.

What is claimed is:

1. In combination:

a cargo area structure for a pick-up truck having a bottom, interior sidewalls and at least one interior end wall, said interior sidewalls and said end wall having a top edge and a bottom edge, said bottom edge being joined to said bottom of said cargo area structure so as to define a corner;

at least one generally planar transverse divider having a first end and a second end and extending between said sidewalls with said first end adjacent one of said sidewalls and said second end adjacent the other of said sidewalls, said divider having a pair of opposed side faces;

a plurality of generally parallel vertically extending slots defined on each of said sidewalls for retaining said ends of said at least one transverse divider in place along said sidewalls, each of said slots being adapted to receive said first end or said second end of said divider; and a locking device operable to securely lock said at least one transverse divider in place in said cargo area structure, said locking device comprising a loop extending from said cargo area structure, said loop positioned such that when said ends of said at least one divider are received in said slots, said loop is disposed adjacent one of said side faces for engaging said side face to retain said divider in place.

2. The combination as defined in claim 1, wherein said at least one transverse divider comprises a pair of transverse dividers extending between said side walls, said combination further comprising a longitudinal divider extending between said transverse dividers and a lid having a first edge hingedly attached to an upper edge of said longitudinal divider, said lid having a closed position wherein said lid covers a portion of said cargo area structure and a open position wherein said lid is pivoted away from said closed position.

3. The combination as defined in claim 2, further comprising an enclosed box mounted within said cargo area structure between said longitudinal divider and one of said sidewalls of said cargo area structure in a position such that said lid covers said box in said closed position.

4. The combination as defined in claim 1, wherein said divider extends closely adjacent said bottom to divide said structure into separated cargo carrying portions.

5. The combination as defined in claim 1, wherein said divider extends closely adjacent said top edges of said sidewall.

6. The combination as defined in claim 1, wherein said structure comprises a truck bed mounted to a pick up truck.

7. The combination as defined in claim 1 wherein said structure comprises a bed liner and wherein said sidewalls, and said at least one end wall and said bottom fit within a pick-up box conventionally provided with said pick-up truck.

8. The combination as defined in claim 1, wherein said loop extends from one of said corners.

9. The combination as defined in claim 1, wherein said loop comprises an eyebolt.

10. The combination as defined in claim 1, wherein said loop extends from said bottom of said cargo area structure.

11. The combination as defined in claim 1, wherein said slots defined on said sidewalls are integrally formed with said sidewalls.

12. The combination as defined in claim 11, wherein said sidewalls each have a plurality of generally vertically extending protrusions defined thereon, said protrusions spaced apart so as to define said slots therebetween.

13. The combination as defined in claim 1 wherein said at least one transverse divider includes at least one mounting bracket.

14. The combination of claim 13 further comprising at least one longitudinal divider extending substantially perpendicular to said at least one transverse divider having a first end secured in said mounting bracket of said at least one transverse divider and a second end secured to a second mounting bracket of a second transverse divider.

15. The combination as defined in claim 14 further comprising an enclosed box mounted within said cargo area structure between said at least one longitudinal divider and one of said walls of said cargo area structure.

16. The combination as defined in claim 15 wherein said box comprises a cover and a hinge mounted between said cover and said at least one longitudinal divider.

* * * * *